No. 817,246. PATENTED APR. 10, 1906.
A. W. HEINLE.
METAL BENDING MACHINE.
APPLICATION FILED JAN. 12, 1905.
3 SHEETS—SHEET 2.
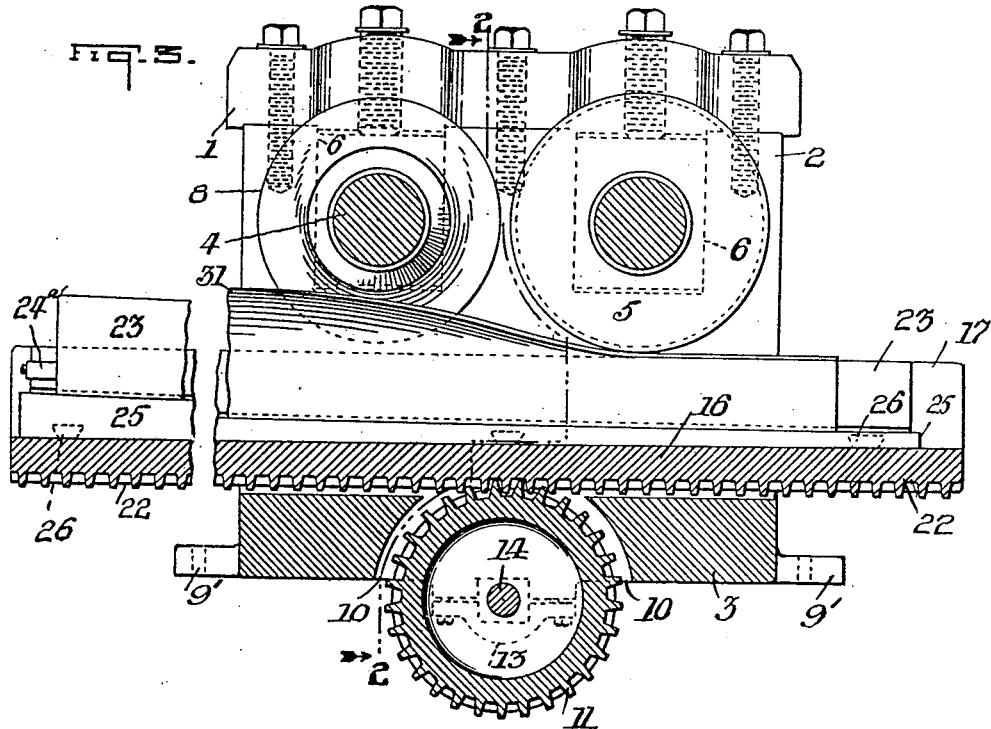
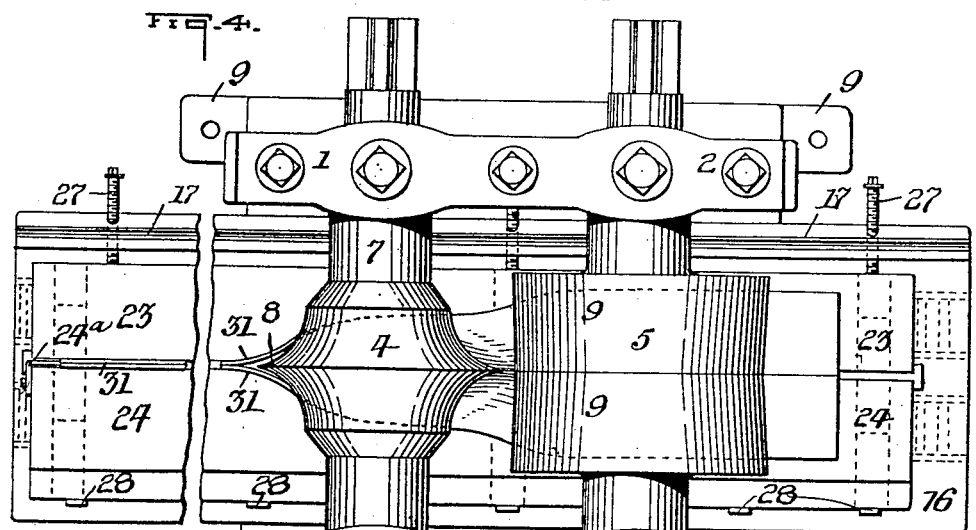
WITNESSES:
INVENTOR
A. W. Heinle
by
John Noland
ATTORNEY

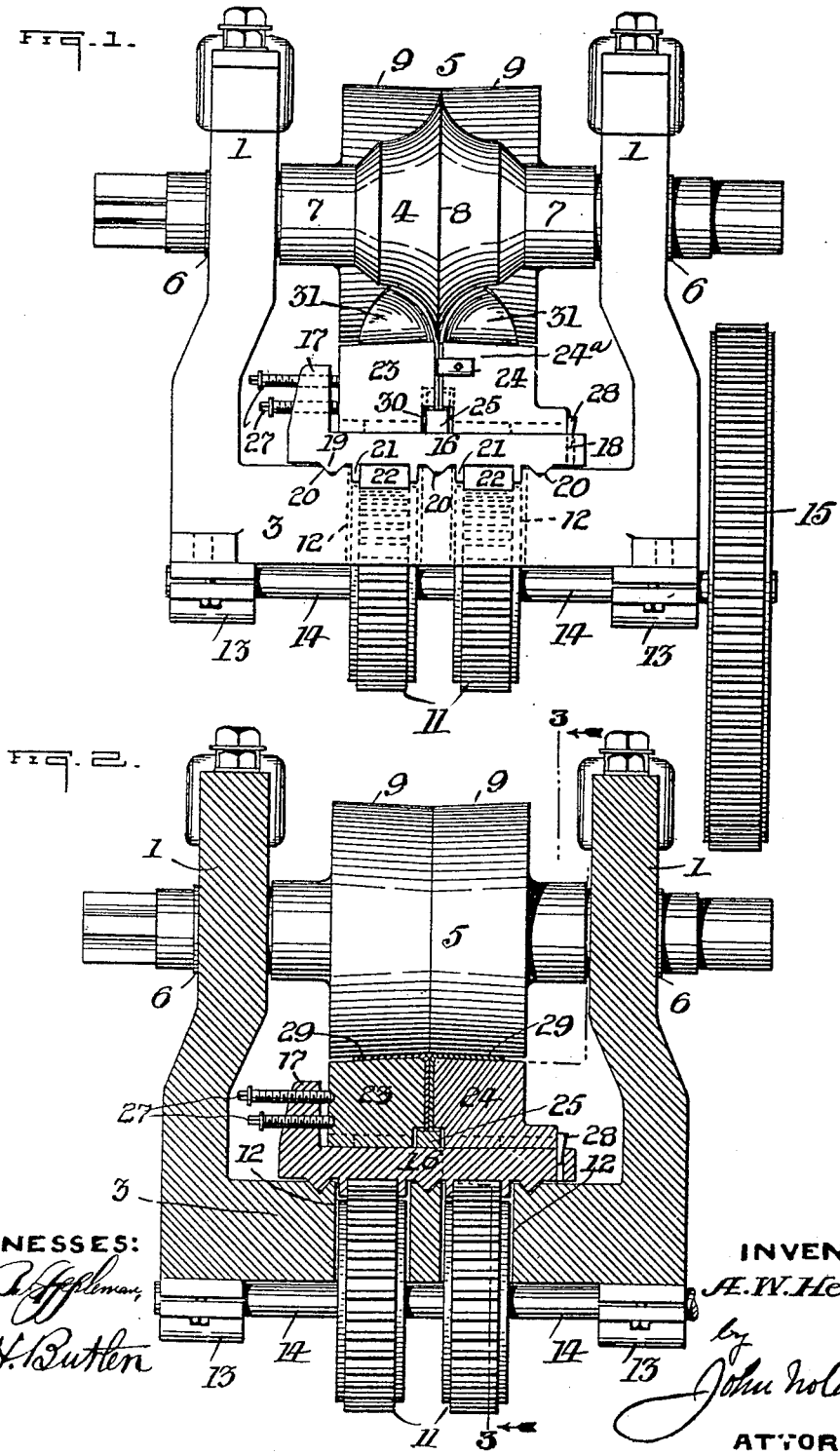

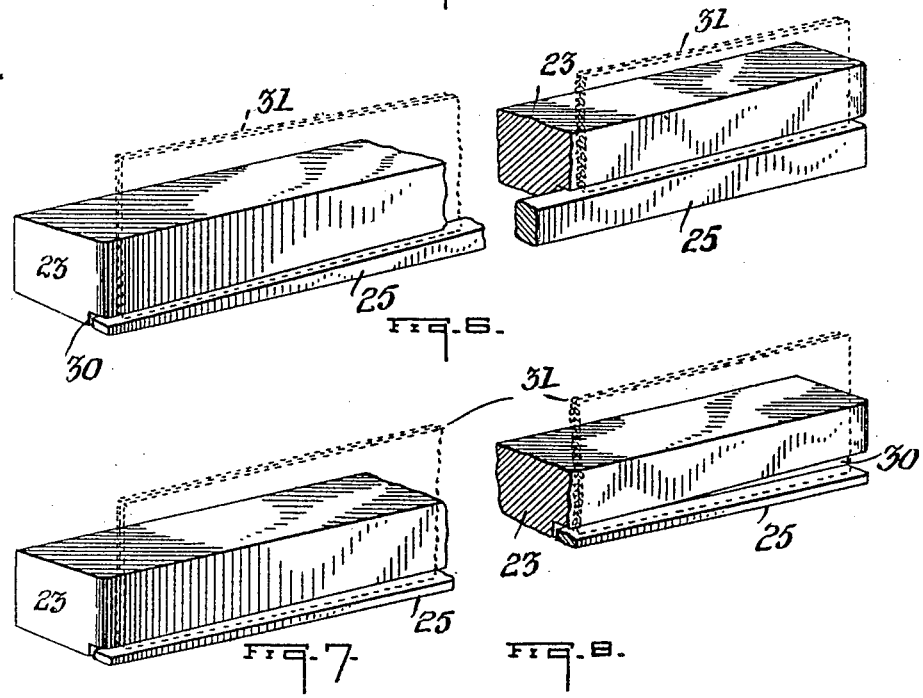

UNITED STATES PATENT OFFICE.

ALBERT W. HEINLE, OF CRAFTON, PENNSYLVANIA, ASSIGNOR OF ONE-HALF TO JOHN NOLAND, OF PITTSBURG, PENNSYLVANIA.

METAL-BENDING MACHINE.

No. 817,246.     Specification of Letters Patent.     Patented April 10, 1906.

Application filed January 12, 1905. Serial No. 240,685.

*To all whom it may concern:*

Be it known that I, ALBERT W. HEINLE, a citizen of the United States of America, residing at Crafton, in the county of Allegheny and State of Pennsylvania, have invented certain new and useful Improvements in Metal-Bending Machines, of which the following is a specification.

This invention relates to certain new and novel improvements in metal-bending machinery, and more particularly to machines adapted for producing angular tapering bars or plates.

To this end the invention aims to provide a machine comprising positive and reliable means for effecting and producing an angular bar—that is, a bar having two plain surfaces lying at an angle one to the other. In this connection the invention is primarily intended for producing bars or plates having angular-disposed surfaces which are particularly adapted for use as structural material and such articles as can be readily made from bars or plates so formed.

With these and other objects in view, which will more readily appear as the invention is better understood, the invention finally consists of the novel construction, combination, and arrangement of parts, which will hereinafter be described; but I desire it to be understood that the invention as hereinafter set forth is susceptible to various changes without departing from the spirit or scope of the invention, and reference will now be had to the drawings, wherein I have illustrated the preferred embodiments of my invention.

Figure 1 is an end view of a machine constructed in accordance with my invention. Fig. 2 is a vertical sectional view taken on the line 2 2 of Fig. 3. Fig. 3 is a longitudinal sectional view of my improved machine, taken on the line 3 3 of Fig. 2. Fig. 4 is a top plan view of my improved machine. Fig. 5 is a perspective view of one of the dies, illustrating the manner in which a tapering angular bar or plate is formed. Fig. 6 is a similar view illustrating dies employed for producing a bar or plate of an angular nature, illustrating the guide in connection therewith. Fig. 7 is a perspective view, partly broken away, of a tapering bar or plate as a finished product. Fig. 8 is a similar view of an angular bar. Fig. 9 is an end view of two pieces of material or stock, illustrating one of the steps of my improved machine during the process or operation of forming angular bars or plates; and Fig. 10 is an end view of two bars in the position they assume when passing out of my improved machine.

To put my invention into practice, I have constructed a machine wherein I employ housings 1 and 2, and in the accompanying drawings I have illustrated these housings as being formed integral by a suitable bed-plate 3; but it is obvious that other types of housings than these shown may be employed and that two or more tandem-arranged housings can be readily used for producing the finished products of my improved machine.

In the housings 1 and 2 are mounted rolls 4 and 5, said rolls being rotatably mounted in adjustable bearings 6 6, which are of a conventional form that need not be further described. A particular feature of my invention resides in the particular formation of the rolls 4 and 5, and the roll 4 will be hereinafter termed a "forming-roll" and the roll 5 a "finishing-roll."

The roll 4 is journaled in the bearings 6 6, and said roll comprises a body portion 7, and intermediate its ends I form an enlarged portion which in the present type of machine is substantially double-coned shaped—that is to say, the enlargement is formed with a projecting annular sharp edge the sides of which gradually taper to the body portion of the roll. This annular sharp edge, which, practically speaking, forms the useful portion of the roll, is designated by the reference-numeral 8.

The roll 5, which is plainly illustrated in Figs. 2 and 4 of the drawings, is formed with substantially annular tapering surfaces which taper inwardly toward the center of the roll, and these beveled or tapering surfaces are designated by the reference-numerals 9 9. The object of forming this roll in this manner will be hereinafter more fully described.

In mounting the rolls within the housing the roll 4 is horizontally alined with the roll 5— that is, the annular sharp edge 8 of the roll 4 is positioned whereby it will aline with the vertex of the angle formed by the inwardly-tapering sides 9 9 of the roll 5.

Reference will now be had to Figs. 1 to 4, inclusive, wherein the construction of the bed-plate and its appurtenant parts can be clearly seen. The bed-plate is provided with lugs 9' 9', whereby the machine can be suitably mounted upon a foundation, and approximately central of said bed-plate I form slots or wheel-wells 10 10, these slots being formed of a sufficient width that they will receive wheels 11 11 and permit the same to extend slightly above guideways or grooves 12 12, formed in the top of the bed-plate. The under face of the housing or bed-plate is provided with suitable bearings 13 13, in which a shaft 14 is journaled, and upon this shaft the two wheels 11 11 are mounted. The outer end of the shaft 14 is provided with a drive-wheel 15, to which any suitable power may be transmitted to operate my improved machine. The reference-numeral 16 designates a movable table or rest which is adapted to move upon the bed-plate 3 between the housing-frames. The movable table upon its one side is provided with a wall or flange 17 and upon its opposite side with a plurality of openings 18, which will be presently described. The bottom face of the table 16 is provided with annular guides 19, which move in the angular guideways 20, formed in the bed-plate 3 upon each side of the slots 10. The bottom of the table is also provided longitudinally of its length with depending flanges 21, and between said flanges are suitably secured tooth-gear racks 22 22, which mesh with gears or tooth-wheels 11 11. These tooth-gear racks can be readily removed when the same have become worn, and I have also made them detachable to facilitate the manufacture and maintenance of my improved machine. Upon the movable table or rest 16 is mounted dies 23 and 24 and a guide 25. The die 23 is dovetailed transversely of the table, as indicated at 26, and this die can be adjusted upon the table by the set-screws or bolts 27 27, which pass through the flange or wall 17 of said table. The die 24 is similarly mounted upon the table 16, and this die is held in position by tapering keys 28, which engage in the apertures 18 of the table. Before again referring to the guide 25 I desire to call attention to the peculiar shape or formation of the dies 23 and 24. These dies are clearly illustrated in Figs. 1, 2, 5, and 6, and by referring to these figures it will be observed that the top surface of the dies tapers outwardly, as indicated at 29 29, this tapering surface corresponding in pitch to the tapering annular surfaces of the roll 5. In other words, that portion of the dies lying beneath the roll 5 is parallel to the surface of said roll, and it will be observed that in order for this to be true the surface of the dies must be tapered their entire length, the object of which will be hereinafter described. The inner face of each die has its lower edge cut away, as indicated at 30, and by referring to Fig. 5 of the drawings it will be observed that this cut-away portion gradually tapers from one end of the die to the other end.

The guide 25 is mounted in the cut-away portion 30 of the dies 23 and 24, and this guide may be retained or adjustably mounted upon the table 16 by any desired means.

The reference-numeral 24$^a$ designates an angular gage detachably mounted on the end of the die 24, and this gage is adapted to extend into the space existing between the dies to limit the inward movement of the plates and correctly position the material between the confronting faces of the dies. This gage 24$^a$ is of less thickness than the materials placed between the dies and at no time engages the confronting faces of the dies or interferes with the faces of the dies when securing the material within the dies. The guide 25 when used in connection with the tapering cut-away portions 30 of the dies 23 and 24 is adapted to regulate the size of the wings of the piece of material being formed. In other words, the tapering guide, as designated by the reference-numeral 25, governs and regulates the center line or vertex of the angles forming the wings of the angular bar. In connection with the dies illustrated in Fig. 6 of the drawings I employ a guide the surfaces of which are parallel or coincide with one another, and this form of guide is employed for producing a piece of material or stock, as illustrated in Fig. 8 of the drawings.

It is to be understood that the guide 25 is removable. By this means guides of different tapers may be easily substituted one for the other in order that the taper of the material being bent may be varied. In order to accomplish this, the guide 25 may be rigidly secured in place and an edge of the metal cut to the desired taper; but the manner first mentioned is the preferred form.

What I claim, and desire to secure by Letters Patent, is as follows:

1. The combination with suitable housings, of rolls journaled therein, a movable table mounted beneath said rolls, adjustable dies mounted upon said table, an adjustable guide carried by said table and means for producing an angular tapering bar or plate from material carried by said table, substantially as described.

2. In a machine of the type described, the combination with suitable housings of rolls, a movable table, dies carried by said table, a stop carried by one of the dies, an adjustable guide mounted upon said table and means for producing angular tapering bars from material carried by said table, substantially as described.

3. In a machine of the type described, the combination with suitable housings of rolls, one of said rolls being of a substantially doubled-coned shaped, the other of said rolls having annular tapering surfaces, means for supporting and moving material beneath said rolls to produce angular bars, substantially as described.

4. In a machine of the type described, the combination with a suitable housing, of horizontally-alined rolls journaled in said housings, a movable table mounted beneath said rolls, dies carried by said table, a guide carried by said table and means for forming an angular tapering bar of material carried by said table beneath said rolls, substantially as described.

5. In a machine of the type described, a movable table, dies carried by the table, the inner face of each die having its lower edge cut away, a guide mounted on the table, and positioned in the cut-away portions of the dies, and means for producing angular bars from material carried by the table.

In testimony whereof I affix my signature, in the presence of two witnesses, this 11th day of January, 1905.

ALBERT W. HEINLE.

Witnesses:
   JOHN NOLAND,
   J. P. APPLEMAN.